(12) United States Patent
Hong et al.

(10) Patent No.: US 10,778,420 B2
(45) Date of Patent: Sep. 15, 2020

(54) QUANTUM DIRECT COMMUNICATION METHOD WITH USER AUTHENTICATION AND APPARATUS USING THE SAME

(71) Applicant: ELECTRONICS AND TELECOMMUNICATIONS RESEARCH INSTITUTE, Daejeon (KR)

(72) Inventors: Changho Hong, Seoul (KR); Nayoung Kim, Daejeon (KR); Osung Kwon, Daejeon (KR); Se Wan Ji, Seoul (KR); Haeng-Seok Ko, Daejeon (KR); Jingak Jang, Daejeon (KR); Daesung Kwon, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 230 days.

(21) Appl. No.: 15/980,919

(22) Filed: May 16, 2018

(65) Prior Publication Data

US 2019/0123896 A1 Apr. 25, 2019

(30) Foreign Application Priority Data

Oct. 20, 2017 (KR) .................. 10-2017-0136505

(51) Int. Cl.
*H04L 9/08* (2006.01)
*H04L 9/32* (2006.01)
(Continued)

(52) U.S. Cl.
CPC .......... *H04L 9/0852* (2013.01); *H04L 9/0869* (2013.01); *H04L 9/32* (2013.01); *H04L 9/3228* (2013.01); *G06N 10/00* (2019.01)

(58) Field of Classification Search
CPC ....... H04L 9/0852; H04L 9/0869; H04L 9/32; H04L 9/3228; G06N 10/00
See application file for complete search history.

(56) References Cited

U.S. PATENT DOCUMENTS

| 7,035,411 | B2* | 4/2006 | Azuma | B82Y 10/00 380/256 |
| 7,359,512 | B1* | 4/2008 | Elliott | H04L 9/0858 380/253 |

(Continued)

FOREIGN PATENT DOCUMENTS

| KR | 10-2011-0057448 A | 6/2011 |
| KR | 10-1659912 B1 | 9/2016 |
| KR | 10-2017-0068437 A | 6/2017 |

OTHER PUBLICATIONS

Fu-Guo Deng et al., "Secure Direct Communication with a Quantum One-Time-Pad," Physical Review A 69, 052319 (2004), DOI:10.1103/PhysRevA.69.052319, 2004 The American Physical Society.

(Continued)

*Primary Examiner* — Yonas A Bayou
(74) *Attorney, Agent, or Firm* — LRK Patent Law Firm

(57) ABSTRACT

A quantum direct communication with user authentication and an apparatus using the same. The quantum direct communication method includes performing verification of security of a quantum channel using a preset channel verification probability and a quantum state source generated by a receiver of quantum direct communication, performing user authentication using one or more of a preset user authentication probability, the quantum state source, and an authentication key shared between the receiver and a sender, stopping quantum direct communication and resetting the quantum channel when the verification of security of the (Continued)

quantum channel fails, and stopping quantum direct communication when the user authentication fails.

19 Claims, 8 Drawing Sheets

(51) Int. Cl.
*G06N 99/00* (2019.01)
*G06N 10/00* (2019.01)

(56) References Cited

U.S. PATENT DOCUMENTS

| | | | | |
|---|---|---|---|---|
| 7,809,143 B2* | 10/2010 | Young | | H04B 10/70 380/278 |
| 7,864,958 B2* | 1/2011 | Harrison | | H04L 9/0858 380/256 |
| 7,974,540 B2* | 7/2011 | Tomita | | H04L 9/0858 398/152 |
| 8,054,976 B2* | 11/2011 | Harrison | | H04B 10/116 380/278 |
| 8,175,270 B2* | 5/2012 | Harms | | H04W 12/06 380/247 |
| 8,639,927 B2 | 1/2014 | Choi et al. | | |
| 8,744,075 B2* | 6/2014 | Tanaka | | H04L 9/3263 380/30 |
| 2004/0151321 A1* | 8/2004 | Lutkenhaus | | H04L 9/0858 380/278 |
| 2013/0243187 A1* | 9/2013 | Horstmeyer | | H04L 9/0897 380/28 |
| 2013/0275757 A1* | 10/2013 | Harrington | | H04L 9/0869 713/171 |
| 2014/0177837 A1* | 6/2014 | Zubairy | | H04B 10/70 380/256 |

OTHER PUBLICATIONS

Chitra Shukla et al., "Semi-quantum communication: protocols for key agreement, controlled secure direct communication and dialogue," Quantum Information Processing (2017), https://doi.org/10.1007/s11128-017-1736-2, Oct. 2017.

* cited by examiner

QUANTUM DIRECT COMMUNICATION METHOD WITH USER AUTHENTICATION AND APPARATUS USING THE SAME

CROSS REFERENCE TO RELATED APPLICATION

This application claims the benefit of Korean Patent Application No. 10-2017-0136505, filed Oct. 20, 2017, which is hereby incorporated by reference in its entirety into this application.

BACKGROUND OF THE INVENTION

1. Technical Field

The present invention relates generally to quantum direct communication technology, and more particularly, to a quantum direct communication method with user authentication and an apparatus using the method, which perform direct communication using quantum information such that secure communication can be performed without requiring pre-shared information, such as a pre-shared communication key. The present invention was supported by the ICT R&D program of MSIP/IITP[1711057505, Reliable crypto-system standards and core technology development for secure quantum key distribution network] and the R&D Convergence program of NST(National Research Council of Science and Technology) of Republic of Korea (Grant No. CAP-18-08-KRISS).

2. Description of Related Art

In modern secure communication technology, two important cores are entity authentication technology and cryptographic communication technology. In particular, for cryptographic communication technology, the pre-sharing of keys between communicators is an essential condition.

A quantum direct communication technique is a technique for achieving the purpose of secure communication using quantum states without requiring a key that is pre-shared between users. Most existing quantum direct communication techniques that have been conventionally proposed use quantum entangled states. However, since the efficiency of generation of quantum entangled states is very low, a lot of research is required in order to use such quantum direct communication in an actual communication environment.

The principal purpose of this quantum direct communication technique is to perform secure communication using quantum information without using pre-shared keys, unlike typical modern cryptographic communication which performs secure communication using pre-shared keys. For secure communication, the authentication of a communication partner, that is, entity authentication, is essential, but the conventionally proposed quantum direct communication techniques have been developed only for secure message communication and are operated separately from entity authentication, and thus other authentication techniques must be inevitably adopted. Due to the absence of a unified quantum authentication technique, quantum direct cryptographic communication occasionally adopts even an entity authentication technique used in modern cryptographic communication.

In connection with this, Korean Patent No. 10-1659912 (Date of registration: Sep. 20, 2016) discloses a technology related to "Apparatus and Method for Quantum Message Authentication."

SUMMARY OF THE INVENTION

Accordingly, the present invention has been made keeping in mind the above problems occurring in the prior art, and an object of the present invention is to provide quantum direct communication technology, which can be easily implemented compared to quantum direct communication using quantum entangled states.

Another object of the present invention is to provide a quantum direct communication technique, which including user authentication in a quantum communication frame.

A further object of the present invention is to provide communication technology, which enables secure communication without requiring information that is pre-shared between users.

Another object of the present invention is to enable secure communication between legitimate users by providing a user authentication procedure and a quantum direct communication technique in an integrated manner.

In accordance with an aspect of the present invention to accomplish the above objects, there is provided a quantum direct communication method with user authentication, including performing verification of security of a quantum channel using a preset channel verification probability and a quantum state source generated by a receiver of quantum direct communication; performing user authentication using one or more of a preset user authentication probability, the quantum state source, and an authentication key shared between the receiver and a sender; stopping quantum direct communication and resetting the quantum channel when the verification of security of the quantum channel fails; and stopping quantum direct communication when the user authentication fails.

Performing the user authentication may include performing user authentication for the receiver using an authentication encryption key that is configured based on authentication information corresponding to a message randomly generated by the sender; and performing user authentication for the sender simultaneously with the verification of security of an A-to-B quantum channel directed from the sender to the receiver.

Performing the user authentication for the receiver may include applying, by the sender, the authentication key to at least one quantum state selected from the quantum state source according to the preset user authentication probability; encrypting, by the sender, at least one quantum state, to which the authentication key is applied, using the authentication encryption key, and then transmitting the encrypted quantum state to the receiver; and detecting, by the receiver, the authentication encryption key based on the authentication key and the quantum state source, and providing authentication information, decrypted using the authentication encryption key, to the sender.

Performing the user authentication may be configured such that a verifier that is any one of the receiver and the sender notifies a verification target that is a remaining one, other than the verifier, that a current mode is a user authentication mode, and provides location information corresponding to the at least one quantum state to a prover.

When the user authentication is user authentication for the sender, the receiver may be the verifier, and when the user authentication is user authentication for the receiver, the sender may be the verifier.

Performing the user authentication for the sender may include applying the authentication key to at least one quantum state, selected by the sender from the quantum state source according to the preset channel verification probability, upon performing the verification of security of the A-to-B quantum channel, and applying a preset encryption operator to the at least one quantum state, to which the authentication key is applied, and transmitting a resulting quantum state to the receiver such that the receiver is capable of performing user authentication in consideration of identicalness of the at least one quantum state.

Location information that is provided to the receiver to perform user authentication for the sender may be identical to location information that is provided to the receiver to perform verification of security of the A-to-B quantum channel.

The quantum direct communication method may further include generating, by the sender, a message encryption operator corresponding to a message to be delivered to the receiver based on a preset encryption operator; transmitting, by the sender, an encrypted result, obtained by applying the authentication key and the message encryption operator to the quantum state source, to the receiver; and decrypting, by the receiver, the message by comparing a result, obtained by applying the authentication key to the quantum state source, with the encrypted result.

The quantum state source may be generated in accordance with a single quantum state other than quantum entangled states.

The verification of security of the quantum channel may be performed on the A-to-B quantum channel and on a B-to-A quantum channel directed from the receiver to the sender.

In accordance with another aspect of the present invention to accomplish the above objects, there is provided a transmission apparatus, including a memory configured to store an authentication key that is shared with a reception apparatus of quantum direct communication; and a processor configured to perform verification of security of an A-to-B quantum channel directed to the reception apparatus using a preset channel verification probability and a quantum state source generated by the reception apparatus and to perform user authentication for the reception apparatus using one or more of a preset user authentication probability, the quantum state source, and the authentication key, and configured to, when the verification of security of the quantum channel fails, stop quantum direct communication, reset the quantum channel, and when the user authentication fails, stop the quantum direct communication.

The processor may be configured to apply the authentication key to at least one quantum state selected from the quantum state source according to the preset user authentication probability, to encrypt the at least one quantum state, to which the authentication key is applied, using an authentication encryption key that is configured based on authentication information corresponding to a randomly generated message, and to transmit the encrypted quantum state to the reception apparatus.

The processor may be configured to receive authentication information, decrypted by the reception apparatus based on the authentication encryption key, and to perform user authentication for reception apparatus by comparing the received authentication information with the authentication information corresponding to the randomly generated message.

The authentication encryption key may be detected based on the authentication key and the quantum state source.

The processor may notify the reception apparatus that a current mode is a user authentication mode and provides location information corresponding to the at least one quantum state to the reception apparatus.

The processor may generate a message encryption operator corresponding to a message to be delivered to the reception apparatus based on a preset encryption operator, and transmitting an encrypted result, obtained by applying the authentication key and the message encryption operator to the quantum state source, thus enabling quantum direct communication to be performed.

In accordance with a further aspect of the present invention to accomplish the above objects, there is provided a reception apparatus, including a memory configured to store an authentication key that is shared with a transmission apparatus of quantum direct communication; and a processor configured to perform verification of security of a B-to-A quantum channel directed from the transmission apparatus using a preset channel verification probability and a quantum state source generated for quantum direct communication, and to perform user authentication for the transmission apparatus using the authentication key and at least one verification quantum state which is received from the transmission apparatus upon performing verification of security of an A-to-B quantum channel, and configured to, when the verification of security of the quantum channel fails, stop quantum direct communication and reset the quantum channel and when the user authentication fails, stop quantum direct communication.

The user authentication for the transmission apparatus may be performed simultaneously with the verification of security of the A-to-B quantum channel.

The processor may be configured to receive location information for the verification of security of the A-to-B quantum channel from the transmission apparatus, and to compare a result, obtained by decrypting the at least one verification quantum state using the authentication key, with at least one quantum state corresponding to the location information in the quantum state source, thus performing user authentication for the transmission apparatus.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
FIG. 1 is a diagram illustrating a quantum direct communication system with user authentication according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a diagram illustrating a quantum direct communication system with user authentication according to an embodiment of the present invention.

Referring to FIG. 1, the quantum direct communication system with user authentication according to an embodiment of the present invention is configured such that a transmission apparatus 110 for sending a message and a reception apparatus 120 for receiving a message may perform quantum direct communication with each other through a quantum channel.

In modern cryptographic communication, communication is performed using so-called classical channels, such as Ethernet channels, but the quantum direct communication according to the embodiment of the present invention may use quantum channels for transmitting quantum states, in addition to the classical channels.

Therefore, in order to securely use quantum direct communication according to the present invention, the security of the quantum channel between the transmission apparatus 110 and the reception apparatus 120 may be verified, as illustrated in FIG. 1.

Also, for secure communication, the authentication of a communication partner is essential. However, since existing quantum direct communication technology was developed only for secure sending/receiving of messages, this does not include a technique for authenticating individual users or entities that use quantum direct communication.

Therefore, as illustrated in FIG. 1, the quantum direct communication system according to the embodiment of the present invention is intended to propose a more secure quantum direct communication method not only by verifying the security of a quantum channel, but also by performing user authentication or entity authentication for each of the transmission apparatus 110 and the reception apparatus 120 that use quantum direct communication.

Figure 2:
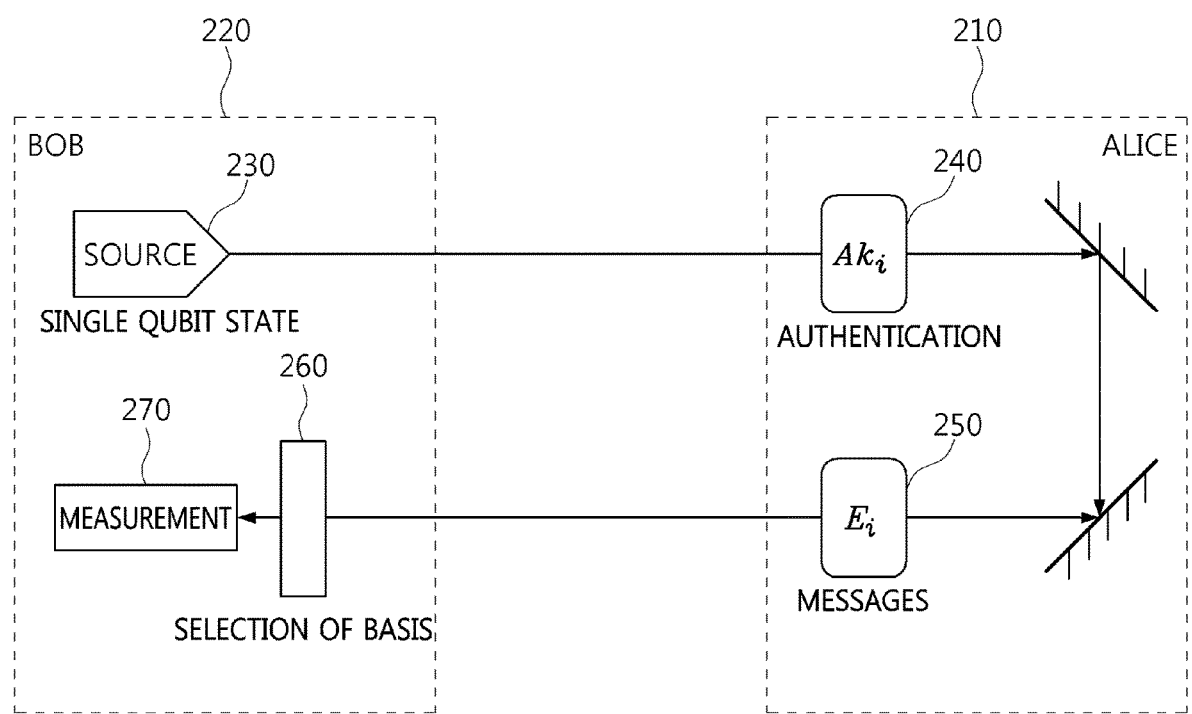
FIG. 2 is a diagram illustrating the configuration of quantum direct communication according to an embodiment of the present invention.

FIG. 2 is a diagram illustrating the configuration of quantum direct communication according to an embodiment of the present invention.

Referring to FIG. 2, quantum direct communication according to the embodiment of the present invention may be basically performed using a quantum state source generated by a receiver for receiving a message.

For example, as illustrated in FIG. 2, it is assumed that there are Alice 210, who is a sender of quantum direct communication, and Bob 220, who is a receiver.

First, Bob 220, the receiver, may generate a quantum state source 230 and transmit the same to Alice 210 so as to receive messages based on quantum direct communication from Alice 210.

For example, Bob 220 may generate a quantum state source $|ini\rangle_i$ using quantum states $|ini\rangle$ corresponding to $|0\rangle$, $|1\rangle$, $|+\rangle$, and $|-\rangle$. Here, subscript i indicates the generation order of quantum state sources (where i=1, 2, . . . . n). The sending order of quantum state sources is based on the generation order. The quantum states $|ini\rangle$ have a relationship such as $|ini\rangle = (|ini\rangle_1, ini\rangle_2, \ldots, |ini\rangle_n)$.

That is, the quantum state source may be represented by $|ini\rangle_i = \{|0\rangle, |1\rangle, |+\rangle, |-\rangle\}$.

Here, each quantum state $|ini\rangle$ may be represented by the following Equation (1):

$$|0\rangle = \begin{pmatrix} 1 \\ 0 \end{pmatrix}, |1\rangle = \begin{pmatrix} 0 \\ 1 \end{pmatrix}, |+\rangle = \begin{pmatrix} 1 \\ 1 \end{pmatrix}, |-\rangle = \begin{pmatrix} 1 \\ -1 \end{pmatrix} \quad (1)$$

Here, quantum states $|ini\rangle$ may be classified according to the type of basis into $\{|0\rangle, |1\rangle\}$ corresponding to a z-basis and $\{|+\rangle, |-\rangle\}$ corresponding to an x-basis.

Here, the term "basis" may mean a function that is the basis of a function space. Space in which human beings live is composed of an x axis, a y axis, and a z axis corresponding to three dimensions (3D), and respective vector components are linearly independent of each other. These components may be combined and may be represented by respective combinations thereof at any locations in 3D space, wherein each of x, y, and z unit vectors may be referred to as a "basis".

Further, the relationship between quantum states $|ini\rangle$ may be represented by the following Equation (2):

$$|+\rangle = \frac{1}{\sqrt{2}}(|0\rangle + |1\rangle)$$
$$|-\rangle = \frac{1}{\sqrt{2}}(|0\rangle - |1\rangle) \quad (2)$$

Thereafter, Alice 210 may notify Bob 220 that the quantum state source 230 has been received.

Further, Alice 210 may verify the security of a B-to-A quantum channel directed from Bob 220 to Alice 210. Here, details of the procedure for verifying the security of the B-to-A quantum channel will be described later with reference to FIG. 3.

When the verification of security of the B-to-A quantum channel fails, the security of the B-to-A quantum channel is not ensured, and thus quantum direct communication is stopped, and the B-to-A quantum channel may be reset.

When the verification of security of the B-to-A quantum channel succeeds, Alice 210 may perform user authentication for Bob 220 using an authentication encryption key composed of the quantum state source 230, an authentication key 240, and authentication information corresponding to a randomly generated message. Details of user authentication for Bob 220 will be described later with reference to FIG. 3.

Here, when user authentication for Bob 220 fails, quantum direct communication may be stopped.

When user authentication for Bob 220 additionally succeeds, Alice 210 may apply the authentication key 240 that is shared with Bob 220 to the quantum state source 230.

Here, authentication operators $\{I, H\}$ may be sequentially applied to each of the quantum states included in the quantum state source based on the authentication key 240. Here, when the value of the authentication key 240 is 0, operator I may be applied, whereas when the value of the authentication key 240 is 1, operator H may be applied.

Here, the operator I may be an identity operator that does not change quantum states and that may be represented by the following Equation (3):

$$I = \begin{pmatrix} 1 & 0 \\ 0 & 1 \end{pmatrix} \quad (3)$$

Further, the operator H may be a Hadamard operator that has the effect of interconverting the bases of the quantum states and that may be represented by the following Equation (4):

$$H = \begin{pmatrix} 1 & 1 \\ 1 & -1 \end{pmatrix} \quad (4)$$

For example, when the operator H is individually applied to |0> and |1> of the z-basis, the quantum states may be converted into |+> and |-> of the x-basis. That is, relationships H|0>=|+> and H|+>=|0> may be obtained.

Thereafter, Alice 210 may verify the security of an A-to-B quantum channel directed from Alice 210 to Bob 220. Details of the procedure for verifying the security of the A-to-B quantum channel will be described later with reference to FIG. 3.

Here, when the verification of the security of the A-to-B quantum channel fails, the security of the A-to-B quantum channel is not ensured, and thus quantum direct communication is stopped, and the A-to-B quantum channel may be reset.

Simultaneously with the verification of security of the A-to-B quantum channel, user authentication for Alice 210 may be performed. Details of user authentication for Alice 210 will be described later together with the procedure for verifying the security of the A-to-B quantum channel in FIG. 3.

When user authentication for Alice 210 fails, quantum direct communication may be stopped.

When both the verification of security of the A-to-B quantum channel and user authentication for Alice 210 succeed, Alice 210 may encrypt the quantum state source, to which the authentication key 240 has been applied, using a message encryption operator 250, which is generated in accordance with a message to be sent to Bob 220, and may send the encrypted quantum state source to Bob 220.

Here, the message encryption operator 250 may be configured based on preset encryption operators $\{I, i\sigma_y\}$, and may be configured to include operator I when the value of a message is 0 and to include operator $i\sigma_y$ when the value of a message is 1.

Here, the operator I may be the same operator as the operator I in the authentication operators.

The operator $i\sigma_y$ may be one of Pauli operators ($i, \sigma_x, \sigma_y, \sigma_z$) that convert the quantum states into $i\sigma_y|0>=-|1>$, $i\sigma_y|1>=|0>$, $i\sigma_y|+>=|->$, and $i\sigma_y|->=-|+>$, and that may be represented by the following Equation (5):

$$i\sigma_y = \begin{pmatrix} 0 & 1 \\ -1 & 0 \end{pmatrix} \quad (5)$$

Thereafter, Bob 220 may select a measurement basis 260 using both the quantum state source 230, which is initially prepared thereby, and the authentication key 240, which is shared with Alice 210, may measure the quantum state received from Alice 210 based on the selected measurement basis 260, and may detect a measurement result 270.

Here, since the measurement result 270 may be determined according to the message encryption operators $\{I, i\sigma_y\}$ used by Alice 210 to perform encryption, Bob 220 may decode the message of Alice 210.

Figure 3:
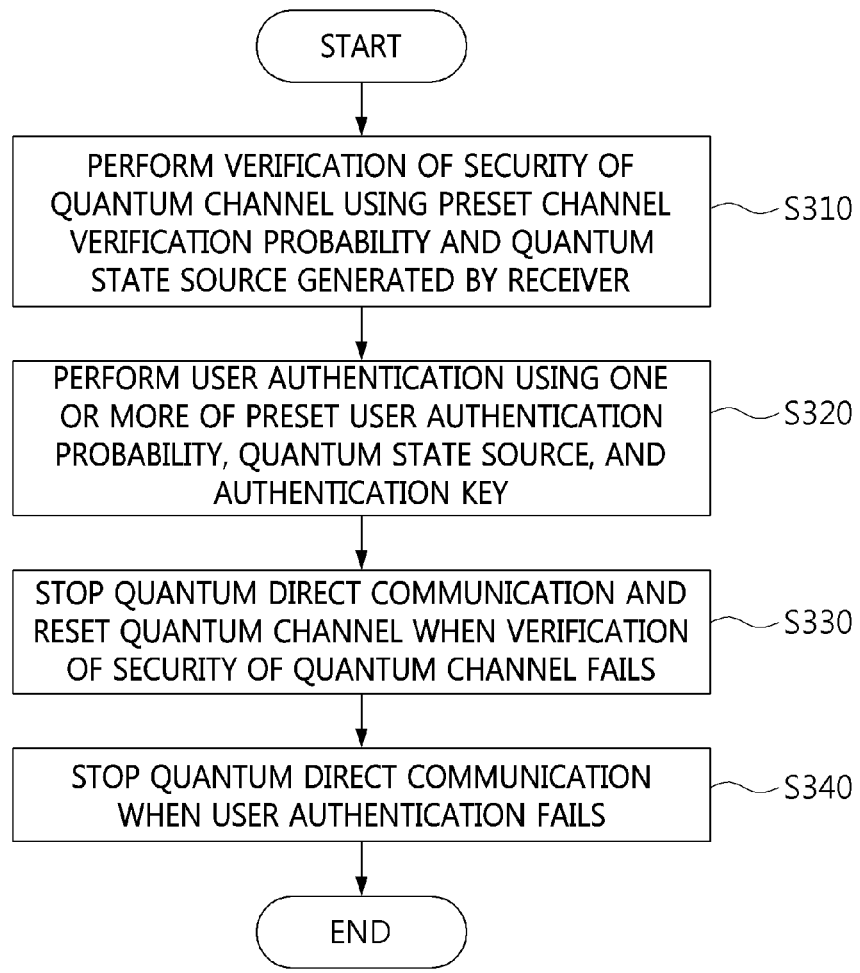
FIG. 3 is an operation flowchart illustrating a quantum direct communication method according to an embodiment of the present invention.

FIG. 3 is an operation flowchart illustrating a quantum direct communication method according to an embodiment of the present invention.

Referring to FIG. 3, the quantum direct communication method according to the embodiment of the present invention performs the verification of security of a quantum channel using a preset channel verification probability and a quantum state source generated by the receiver of quantum direct communication at step S310.

Here, the verification of security of the quantum channel may be performed on an A-to-B quantum channel directed from a sender to a receiver and a B-to-A quantum channel directed from the receiver to the sender.

According to the flow of the quantum direct communication method according to the embodiment of the present invention, the verification of security of the B-to-A quantum channel may be performed first, and the verification of security of the A-to-B quantum channel may be subsequently performed.

For example, a procedure for verifying the security of the B-to-A quantum channel is described as follows.

First, the sender may receive a quantum state source from the receiver.

The sender may select some of a plurality of quantum states included in the quantum state source as a verification quantum state required for the security verification of the B-to-A quantum channel, based on a preset channel verification probability. That is, each quantum state may be selected as the verification quantum state at the preset channel verification probability.

Thereafter, the sender may randomly select any one of a z-basis and an x-basis, and may use the selected basis as a measurement basis for measuring the verification quantum state and then perform measurement.

Next, the sender may notify the receiver that the verification of security of the B-to-A quantum channel is currently being performed, and may request a basis and a quantum state at the location of the quantum state, selected as the verification quantum state, from the receiver. Here, in response to the request of the sender, the receiver may open a basis and a quantum state at the selected location in the quantum state source to the sender.

Thereafter, the sender may determine whether the measurement basis, randomly selected by the sender, is identical to the basis opened by the receiver. If the randomly selected measurement basis is identical to the opened basis, the sender may determine whether a result, obtained by measuring the verification quantum state based on the randomly selected measurement basis, is identical to the quantum state opened by the receiver, and may then verify the security of the B-to-A quantum channel.

Further, a procedure for verifying the security of the A-to-B quantum channel is described as follows.

First, the sender may apply authentication operators $\{I, H\}$ to a quantum state source received from the receiver using an authentication key. Here, as the authentication operators are applied to the quantum state source, the basis of the quantum state source may be changed.

Next, the sender may select some of quantum states in the quantum state source to which the corresponding authentication operator is applied as a verification quantum state required for the security verification of the A-to-B quantum channel, based on a preset channel verification probability.

Here, the preset channel verification probability used for the security verification of the A-to-B quantum channel and the preset channel verification probability used for the security verification of the B-to-A quantum channel may be identical to or different from each other.

Thereafter, the sender may apply encryption operator I to the verification quantum state, and may then send a resulting verification quantum state to the receiver through the A-to-B quantum channel. Here, the encryption operator I may be an operator, which does not change quantum states. That is, the encryption operator I is applied to a message, which is sent to the receiver to verify the security of the A-to-B quantum channel, and the message may not be encrypted.

Further, the sender may notify the receiver that the verification of security of the A-to-B quantum channel is currently being performed, and may provide the location selected as the verification quantum state to the receiver.

Thereafter, the receiver may reconstruct, in consideration of the location provided from the sender, the verification quantum state using the authentication key at the corresponding location, may determine whether a reconstructed result value is identical to the value of the initial quantum state source, and may then verify the security of the A-to-B quantum channel.

Through the above-described method, the verification of security of each of the A-to-B quantum channel and the B-to-A quantum channel may be performed. When the verification of security fails, quantum direct communication may be stopped and quantum channels may be reset because the security of the quantum channels is not ensured.

Here, the quantum state source generated by the receiver may be generated in accordance with a single quantum state, other than quantum entangled states.

Further, quantum states constituting the quantum state source may be non-orthogonal to each other. Therefore, since the quantum states prepared by the receiver are non-orthogonal to each other, error may occur when parties other than the only receiver who is aware of the basis information measure the quantum states. An error rate occurring in this way may be a criterion for determining whether an intermediate attacker intervenes in the communication.

For example, it may be assumed that an attacker intends to obtain message information in the middle of a quantum channel. The attacker may intercept and measure a quantum state source when the receiver generates the quantum state source and transmits the quantum state source to the sender through the B-to-A quantum channel.

In this case, the attacker may select any one of two types of measurement bases, that is, a z-basis and an x-basis, measure the quantum state source based on the selected measurement basis, and record the result of measurement. Here, since the attacker cannot be aware of the basis selected by the receiver when the quantum state source is generated, the attacker may randomly select the measurement basis.

Thereafter, the attacker may generate a quantum state source identical to the attacker's measurement result and retransmit the generated quantum state source to the sender.

Then, the sender may transmit the quantum state source, to which an authentication key and a message encryption operator are applied, to the receiver through the A-to-B quantum channel.

At this time, the attacker may gain access to the A-to-B quantum channel again and may measure the quantum state source, which is transmitted to the receiver, that is, the quantum state source to which the authentication key and the message encryption operator are applied, and may record the result of the measurement. The attacker may measure the quantum state source based on the measurement basis that was previously used by himself.

Thereafter, the attacker may retransmit the quantum state source, to which the authentication key and the message encryption operator are applied, to the receiver.

During this attack procedure, the attacker may attack the A-to-B quantum channel and the B-to-A quantum channel. Here, the probability that the measurement basis, selected by the attacker in the attack on the B-to-A quantum channel, which is an initial attack, will be identical to the basis selected by the receiver when generating the quantum state source, is ½. Even if the attacker selects the other basis, the probability that quantum states in the measurement basis, selected by the attacker in the attack, will be measured as the quantum states generated by the receiver is ½. In summary, the error rate occurring due to the access to the B-to-A quantum channel by the attacker may be ¼, as represented by the following Equation (6):

$$P_{BtoA-e} = \left(1 - \frac{3}{4}\right) = \frac{1}{4} \quad (6)$$

Therefore, when an error rate of ¼ or more occurs while the security of the B-to-A quantum channel is verified, the sender may determine that an attacker has gained access to the B-to-A quantum channel and may decide that the verification of security fails.

Here, when the number of quantum states selected for the security verification of the quantum channel is assumed to be 'c', an attacker detection probability $P_d$ may be calculated by the following Equation (7):

$$P_d = 1 - \left(\frac{3}{4}\right)^c \quad (7)$$

That is, as the value of c is larger, the value of $P_d$ converges on 1. Thus, the greater the number of quantum states that are used to verify the security of the quantum channel, the higher the probability of the access by the attacker being detected.

Here, the result of analysis based on Equation (6) and Equation (7) may be equally applied to the A-to-B quantum channel and to the B-to-A quantum channel.

Further, whether a reliable message can be acquired before the existence of the attacker is revealed may be analyzed using the following procedure.

For example, the probability that a measurement result, obtained when the attacker gains access to the B-to-A quantum channel, is identical to that of the quantum state source generated by the receiver may be ¾.

In this case, since an authentication operator is applied, in addition to an encryption operator, to the quantum state source transmitted to the receiver through the A-to-B quantum channel, the probability that measurement result, obtained when the attacker gains access to the A-to-B quantum channel, will be meaningful information in practice may be $(3/4) \times (3/4) = 9/16$. That is, only about half of the measurement result may be trusted.

However, before this information is obtained, the existence of the attacker may be revealed during the procedure for verifying the security of the quantum channels and authenticating the user.

Further, the technique proposed according to an embodiment of the present invention may take the form of one-time pad encryption, which is one of modern encryption techniques. One-time pad encryption guarantees that even if encrypted messages are stolen by an attacker, the messages are not leaked (completely safe).

Therefore, the technique proposed in the present invention may be regarded as a kind of quantum one-time pad encryption technique, and may guarantee higher security than the existing one-time pad technique among modern encryption techniques. That is, in the technique proposed in the present invention, there is no possibility that all encrypted messages will be stolen by the attacker because the probability of the attacker selecting the same basis as the receiver is ½. The attacker cannot even identify which measurement result is reliable information and which measurement result is unreliable information.

The amount of mutual information H(B:E) between the receiver and the attacker may be represented by Holevo's bound[*1], as given by the following Equation (8):

$$H(B:E) \leq S(\rho) - \sum_x p_x S(\rho_x) \quad (8)$$

where $\rho_x$ in $$\rho = \sum_x p_x \rho_x$$

may denote a quantum state prepared by the receiver at a probability of $p_x$. Further, $S(\rho)$ may denote Von Neumann entropy[*1]. Here, the receiver may randomly select some quantum states from among quantum states ($\{|0\rangle, |1\rangle, |+\rangle, |-\rangle\}$ and may configure a quantum state source. If the quantum states constituting the quantum state source are respectively selected at the same probability of ¼, Equation (8) may indicate the relationships in the following Equation (9):

$$H(B:E) \leq S(\rho) - \sum_x p_x S(\rho_x) < H(B) \quad (9)$$
$$H(B) = \sum_x (-p_x \log_2 p_x) = 2$$

Equation (9) may indicate that the sender and the receiver may securely transmit and receive the quantum state source.

Further, the quantum direct communication method according to an embodiment of the present invention performs user authentication using one or more of a preset user authentication probability, quantum state information, and an authentication key shared between the receiver and the sender at step S320.

Here, user authentication may be performed for the receiver and the sender of quantum direct communication.

That is, the user authentication for the receiver may be performed using an authentication encryption key that is configured based on authentication information corresponding to a message randomly generated by the sender. Alternatively, user authentication for the sender may be performed simultaneously with the security verification of the A-to-B quantum channel directed from the sender to the receiver.

Below, user authentication for the receiver will be described.

First, the sender may apply an authentication key to at least one quantum state selected from the quantum state source according to a preset user authentication probability.

For example, it may be assumed that the preset user authentication probability is 50% and that the quantum state source is configured to correspond to {m1, m2, m3, m4, m5}. Here, each of the quantum states constituting the quantum state source, that is, m1 to m5, may be selected as a quantum state required for user authentication at a probability of 50%.

Here, the authentication encryption key may be applied in such a way that an authentication operator corresponding to the value of the authentication encryption key randomly selected by the sender is applied to the at least one quantum state.

The user authentication method according to the embodiment of the present invention may apply operator I when the value of the authentication key is 0, and may apply operator H when the value of the authentication key is 1. Therefore, the location of the at least one quantum state selected for user authentication may be checked, and the authentication operator may be applied depending on the value of the authentication key corresponding to the checked location.

In the above example, assuming that an authentication key shared between the receiver and the sender is (11010), operator H, corresponding to the authentication key 1, may be applied to quantum state m2, and operator I, corresponding to the authentication key 0, may be applied to quantum state m3.

Thereafter, the at least one quantum state, to which the authentication key is applied, may be encrypted using the authentication encryption key randomly selected by the sender, and the encrypted quantum state may be transmitted to the receiver.

For example, in order to perform user authentication for the receiver, it may be assumed that quantum states, selected from the quantum state source (m1, m2, m3, m4, m5) according to the preset user authentication probability, are (m2, m3). Here, the transmission apparatus generates an authentication encryption key in accordance with randomly selected (1, 1), and may configure an encryption operator selected based on the authentication information. Here, using the same method as the encryption of a message, when the value of the authentication information is 0, operator I may be used, whereas when the value of the authentication information is 1, operator $i\sigma_y$ may be used. Therefore, the quantum states (m2, m3) may be encrypted using the authentication encryption key composed of ($i\sigma_y$, $i\sigma_y$), and may be provided to the receiver that is a verification target.

Here, for user authentication, a verifier that is at least one of the receiver and the sender may notify a prover that is a remaining one, other than the verifier, that the current mode is a user authentication mode, and may provide location information corresponding to at least one quantum state.

In the case of user authentication for the sender, the receiver may be the verifier, and in the case of user authentication for the receiver, the sender may be the verifier.

Therefore, in the case of user authentication for the receiver, the sender may notify the receiver that the current mode is the user authentication mode, and may provide location information corresponding to at least one quantum state to the receiver.

Thereafter, the receiver may detect the authentication encryption key based on the authentication key and the quantum state source, and may provide the authentication information decoded using the authentication encryption key to the sender.

For example, the receiver may compare an initial quantum state prepared thereby with a message, encrypted by and transmitted from the sender, and may then detect the authentication encryption key. The receiver may acquire authentication information by decrypting the detected authentication encryption key, and may provide the acquired authentication information to the sender. Here, the sender may perform user authentication by checking whether the authentication information received from the receiver is identical to information of the authentication encryption key randomly generated by the sender.

Further, user authentication for the sender will be described in detail below.

Here, since user authentication for the sender is performed simultaneously with the verification of security of the A-to-B quantum channel directed from the sender to the receiver, user authentication may be performed using the quantum state source that is used when the security of the A-to-B quantum channel is verified.

For example, when the security of the A-to-B quantum channel is verified, the sender may select a verification quantum state for security verification from the result $Ak_i|ini\rangle_i$, obtained by applying authentication operators {I, H} based on an authentication key $Ak_i$ to a quantum state source $|ini\rangle_i$ received from the receiver. That is, since the authentication key $Ak_i$ is already applied to the verification quantum state, selected for the security verification of the A-to-B quantum channel, the receiver must also recover the verification quantum state $|ini\rangle_i$ using the authentication key $Ak_i$. By means of this procedure, it may be determined that user authentication for the sender has been performed.

That is, the receiver may reconstruct the verification quantum state (for security verification of the A-to-B quantum channel) received from the sender using the authentication key, and may perform user authentication for the sender in such a way as to compare the verification quantum state reconstructed by the receiver with the initial quantum state source.

Therefore, location information provided to the receiver so as to perform user authentication for the sender may be identical to location information provided to the receiver to verify the security of the A-to-B quantum channel.

Also, upon performing user authentication for the sender, a message may not be encrypted depending on the stage for verifying the security of the A-to-B quantum channel.

Further, the quantum direct communication method according to the embodiment of the present invention may stop quantum direct communication and reset the quantum channel when the verification of security of the quantum channel fails at step S330.

For example, when the verification of security of the A-to-B quantum channel fails, the A-to-B quantum channel may be reset with the quantum direct communication stopped, and thereafter quantum direct communication may resume.

Further, when the verification of security of the B-to-A quantum channel fails, the B-to-A quantum channel may be reset with the quantum direct communication stopped, and thereafter quantum direct communication may resume.

Next, the quantum direct communication method according to an embodiment of the present invention stops quantum direct communication when user authentication fails at step S340.

That is, when at least one of the sender and receiver that perform quantum direct communication fails in user authentication, the security of communication cannot be guaranteed, and thus quantum direct communication may be stopped.

Further, although not illustrated in FIG. 3, in the quantum direct communication method according to the embodiment of the present invention, the sender generates a message encryption operator corresponding to a message to be delivered to the receiver based on a preset encryption operator.

For example, when a message desired to be delivered by the sender is (110100), message encryption operators to be applied by the sender to the quantum state source received from the receiver may be ($i\sigma_y$, $i\sigma_y$, I, $i\sigma_y$, I, I).

Although not illustrated in FIG. 3, in the quantum direct communication method according to the embodiment of the present invention, the sender transmits the result of encryption to which the authentication key and the message encryption operators are applied to the quantum state source to the receiver.

Although not illustrated in FIG. 3, in the quantum direct communication method according to the embodiment of the present invention, the receiver decrypts the message by comparing the result of application of the authentication key to the quantum state source with the encrypted result.

For example, the receiver may measure and compare the result $Ak_i|ini\rangle_i$ of application of the authentication key $Ak_i$ to the quantum state source $|ini\rangle_i$ and the encrypted result Ei $Ak_i|ini\rangle$ received from the sender with each other on an accurate basis, and may then detect a message encryption operator $E_i$.

By means of this quantum direct communication method with user authentication, there may be provided a quantum direct communication technique that enables user authentication to be performed in a quantum communication frame.

Figure 4:
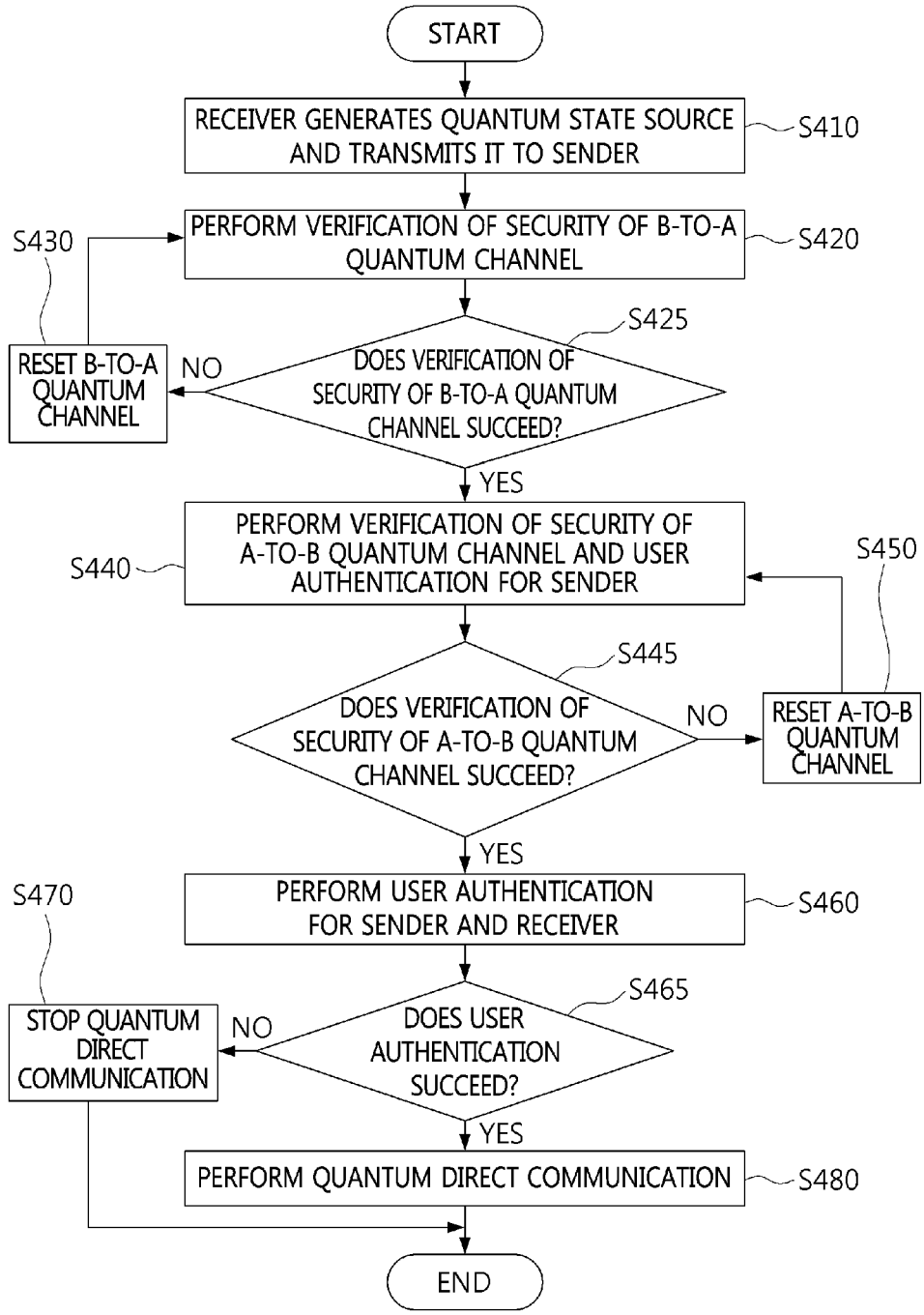
FIG. 4 is an operation flowchart illustrating in detail a quantum direct communication method according to an embodiment of the present invention.

FIG. 4 is an operation flowchart illustrating a quantum direct communication method according to an embodiment of the present invention.

Referring to FIG. 4, in the quantum direct communication method according to the embodiment of the present invention, when a receiver of quantum direct communication generates a quantum state source and transmits the same to a sender at step S410, users (sender and receiver) may perform the verification of security of a B-to-A quantum channel based on the quantum state source, which is transmitted and received, and an authentication key shared between the users of the quantum direct communication(step S420).

Here, the B-to-A quantum channel may be a quantum channel directed from the receiver to sender.

Thereafter, whether the verification of security of the B-to-A quantum channel succeeds is determined at step S425. If it is determined that the verification of security of the B-to-A quantum channel fails, the B-to-A quantum channel may be reset at step S430.

Here, during the resetting of the B-to-A quantum channel, quantum direct communication may be stopped. After the B-to-A quantum channel is reset, the verification of security of the B-to-A quantum channel may be performed again.

Further, if it is determined at step S425 that the verification of security of the B-to-A quantum channel succeeds, the verification of security of an A-to-B quantum channel and user authentication for the sender may be performed using the result, obtained by the sender applying the authentication key to the quantum state source, at step S440.

Here, the A-to-B quantum channel may be a quantum channel directed from the sender to receiver.

Thereafter, whether the verification of security of the A-to-B quantum channel succeeds is determined at step S445. If it is determined that the verification of security of the A-to-B quantum channel fails, the A-to-B quantum channel may be reset at step S450.

During the resetting of the A-to-B quantum channel, quantum direct communication may be stopped. After the A-to-B quantum channel is reset, the verification of security of the A-to-B quantum channel may be performed again.

Also, if it is determined at step S445 that the verification of security of the A-to-B quantum channel succeeds, user authentication for the sender and the receiver may be performed using the message that is sent to the receiver upon verifying the security of the A-to-B quantum channel, the initial quantum state source generated by the receiver, and the authentication encryption key applied by the sender at step S460.

Thereafter, whether user authentication for the sender and the receiver succeeds is determined at step S465. When user authentication for the sender and the receiver fails, quantum direct communication may be stopped at step S470.

Further, if it is determined at step S465 that user authentication for the sender and the receiver succeeds, the sender sends an encrypted message to the receiver, and thus quantum direct communication may be performed at step S480.

Figure 5:
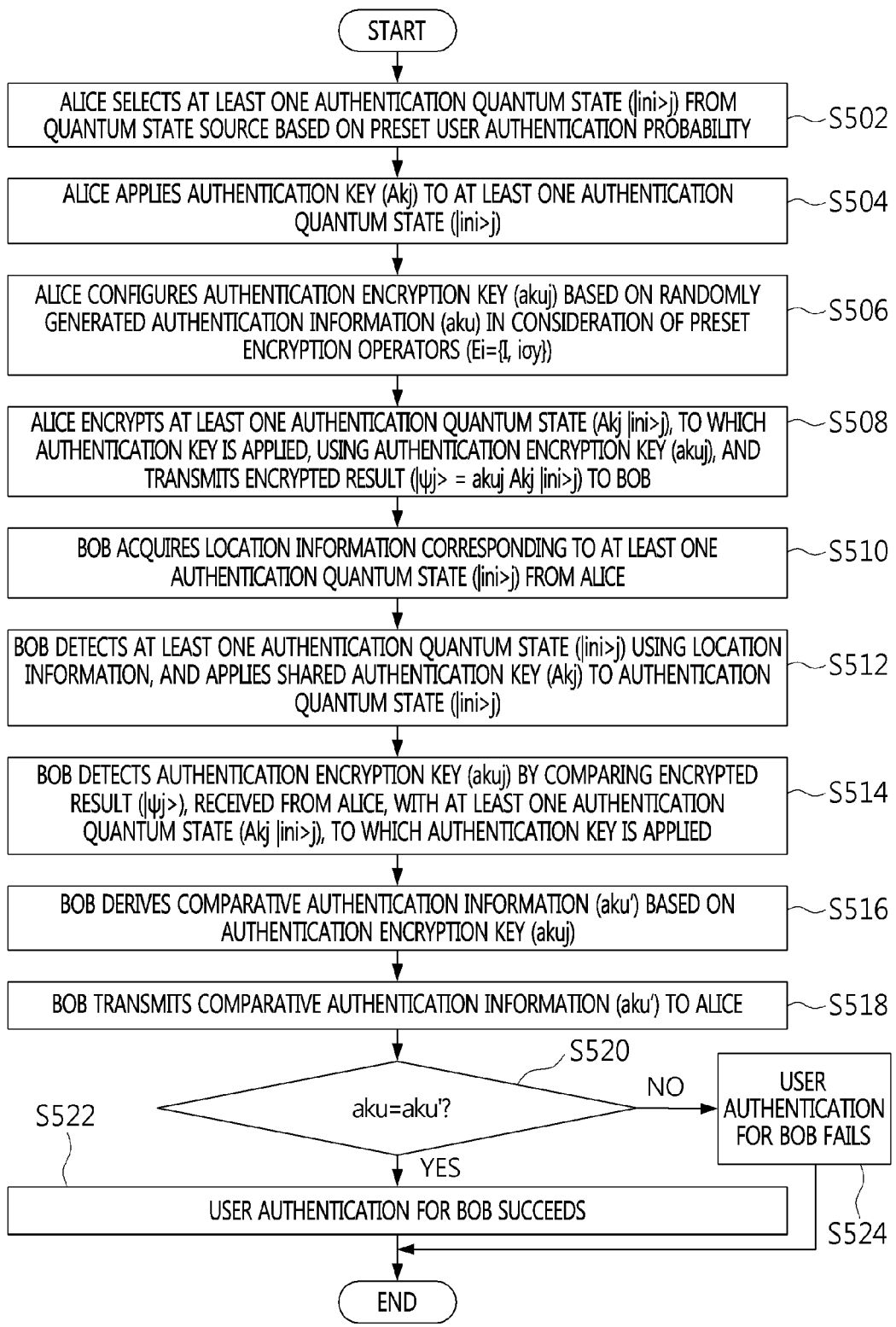
FIG. 5 is an operation flowchart illustrating in detail a procedure for performing user authentication for a receiver (Bob) in the quantum direct communication method according to the present invention.

FIG. 5 is an operation flowchart illustrating in detail the procedure for performing user authentication for a receiver (Bob) in the quantum direct communication method according to the present invention.

Referring to FIG. 5, in user authentication for the receiver according to the present invention, Alice, who is the sender, may select at least one authentication quantum state $|ini\rangle_j$ from a quantum state source received from Bob, who is the receiver, based on a preset user authentication probability at step S502.

Thereafter, Alice may apply an authentication key $Ak_j$ that is shared with Bob to the at least one authentication quantum state $|ini\rangle_j$ at step S504.

Next, Alice may configure an authentication encryption key $aku_j$ based on authentication information aku corresponding to a message that is randomly generated in consideration of preset encryption operators $\{I, i\sigma_y\}$ at step S506.

Next, Alice may encrypt at least one authentication quantum state $Ak_j |ini\rangle_j$, to which the authentication key is applied, using the authentication encryption key $aku_j$, and may transmit an encrypted result $|\Psi_j\rangle$ to Bob at step S508.

Next, Bob may acquire location information corresponding to at least one authentication quantum state $|ini\rangle_j$ from Alice at step S510, and may detect at least one authentication quantum state $|ini\rangle_j$ from the quantum state source using the location information, and apply the shared authentication key $Ak_j$ to the detected authentication quantum state $|ini\rangle_j$ at step S512.

Next, Bob may decode the authentication encryption key $aku_j'$ generated by Alice by comparing the encrypted result $|\Psi_j\rangle$, received from Alice, with the at least one authentication quantum state $Ak_j |ini\rangle_j$, to which the authentication key is applied at step S512, at step S514.

Next, Bob may derive authentication information (comparative authentication information) aku' to be compared for user authentication based on the detected authentication encryption key $aku_j'$ at step S516.

Thereafter, when Bob transmits the authentication information aku' to Alice at step S518, Alice may determine whether the authentication information aku generated thereby is identical to the received authentication information aku' at step S520.

If it is determined at step S520 that two pieces of authentication information are identical to each other, it may be determined that user authentication for Bob succeeds at step S522.

Further, if it is determined at step S520 that the two pieces of authentication information are not identical to each other, user authentication for Bob fails at step S524, and quantum direct communication between Alice and Bob may be stopped.

Figure 6:
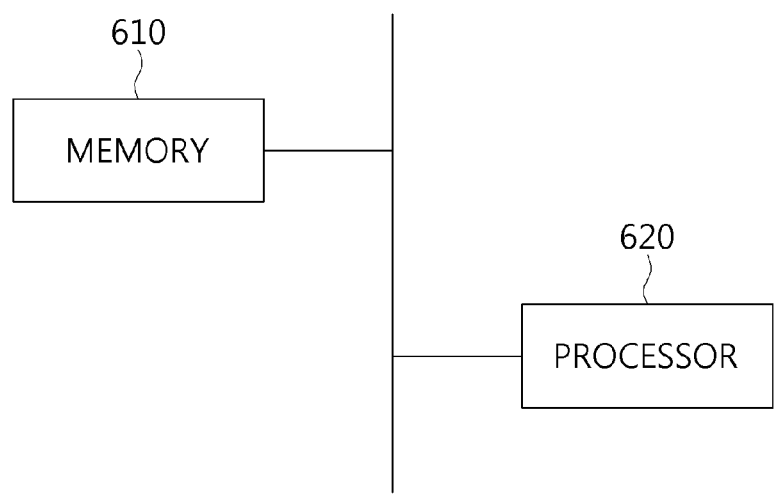
FIG. 6 is a block diagram illustrating an example of the transmission apparatus illustrated in FIG. 1.

FIG. 6 is a block diagram illustrating an example of the transmission apparatus illustrated in FIG. 1.

Referring to FIG. 6, the transmission apparatus 110 illustrated in FIG. 1 includes memory 610 and a processor 620.

The memory 610 stores an authentication key that is shared with the reception apparatus of quantum direct communication.

The processor 620 performs the verification of security of an A-to-B quantum channel directed to the reception apparatus using a preset channel verification probability and a quantum state source generated by the reception apparatus.

First, an authentication key composed of authentication operators $\{I, H\}$ may be applied to the quantum state source received from the reception apparatus. Here, as the authentication key is applied, the basis of the quantum state source may be changed.

Thereafter, some of quantum states in the quantum state source, to which the authentication key is applied, may be selected as a verification quantum state for the verification of security of the A-to-B quantum channel, based on the preset channel verification probability.

Next, after encryption operator I is applied to the verification quantum state, a resulting verification quantum state may be transmitted to the reception apparatus through the A-to-B quantum channel. Here, the encryption operator I may be an operator that does not change the quantum state. That is, the operator I is applied to a message that is sent to the reception apparatus to perform the verification of security of the A-to-B quantum channel, and thus the corresponding message may not be encrypted.

Further, the transmission apparatus may notify the reception apparatus that the security of the A-to-B quantum channel is currently being verified, and may provide the location of the quantum state selected as the verification quantum state to the reception apparatus.

Thereafter, the reception apparatus may reconstruct, in consideration of the location provided from the transmission apparatus, the verification quantum state using the authentication key at the corresponding location, may determine whether the reconstructed result value is identical to the value of the initial quantum state source, and may then verify the security of the A-to-B quantum channel.

Then, the processor 620 may perform user authentication for the reception apparatus using one or more of a preset user authentication probability, the quantum state source, and the authentication key.

Here, the authentication key may be applied to at least one quantum state selected from the quantum state source according to the preset user authentication probability.

For example, it may be assumed that the preset user authentication probability is 50% and that the quantum state source is configured to correspond to {m1, m2, m3, m4, m5}. Here, each of the quantum states constituting the quantum state source, that is, m1 to m5, may be selected as a quantum state required for user authentication at a probability of 50%.

Here, the authentication encryption key may be applied in such a way that an authentication operator corresponding to the value of the authentication encryption key randomly selected by the sender (the transmission apparatus) is applied to the at least one quantum state.

The user authentication method according to the embodiment of the present invention may apply operator I when the value of the authentication key is 0, and may apply operator H when the value of the authentication key is 1. Therefore, the location of the at least one quantum state selected for user authentication may be checked, and the authentication operator may be applied depending on the value of the authentication key corresponding to the checked location.

In the above example, assuming that an authentication key shared between the receiver (the reception apparatus) and the sender is (11010), operator H, corresponding to the authentication key 1, may be applied to quantum state m2, and operator I, corresponding to the authentication key 0, may be applied to quantum state m3.

Thereafter, the at least one quantum state, to which the authentication key is applied, may be encrypted using the authentication encryption key randomly selected by the sender, and the encrypted quantum state may be transmitted to the receiver.

For example, in order to perform user authentication for the receiver, it may be assumed that quantum states, selected from the quantum state source (m1, m2, m3, m4, m5) according to the preset user authentication probability, are (m2, m3). Here, the transmission apparatus generates an authentication encryption key in accordance with randomly selected (1, 1), and may configure an encryption operator selected based on the authentication information. Here, using the same method as the encryption of a message, when the value of the authentication information is 0, operator I may be used, whereas when the value of the authentication information is 1, operator $i\sigma_y$ may be used. Therefore, the quantum states (m2, m3) may be encrypted using the authentication encryption key composed of ($i\sigma_y$, $i\sigma_y$), and may be provided to the receiver corresponding to a verification target.

At this time, the transmission apparatus may notify the reception apparatus that a current mode is a user authentication mode, and may provide location information corresponding to at least one quantum state.

Here, the transmission apparatus may receive authentication information decrypted by the reception apparatus based on the authentication encryption key and may compare the received authentication information with authentication information generated by the transmission apparatus, and may then perform user authentication for the reception apparatus.

For example, the reception apparatus may detect an authentication encryption key by comparing an initial quantum state prepared thereby with the message, encrypted by and sent from the transmission apparatus. The reception apparatus may acquire authentication information by decrypting the encrypted message using the detected authentication encryption key, and may provide the acquired authentication information to the transmission apparatus. Here, the transmission apparatus may perform user authentication for the reception apparatus by determining whether the authentication information received from the reception apparatus is identical to the authentication information randomly generated by the transmission apparatus.

Further, when the verification of security of the quantum channels fails, the processor 620 may stop quantum direct communication, and may reset the quantum channels.

For example, when the verification of security of the A-to-B quantum channel fails, the A-to-B quantum channel may be reset with the quantum direct communication stopped, and thereafter quantum direct communication may resume.

Further, when the verification of security of the B-to-A quantum channel fails, the B-to-A quantum channel may be reset with the quantum direct communication stopped, and thereafter quantum direct communication may resume.

Meanwhile, when user authentication fails, the processor 620 stops quantum direct communication.

That is, if at least one of the transmission apparatus and the reception apparatus, which perform quantum direct communication, fails in user authentication, the security of communication cannot be guaranteed, and thus quantum direct communication may be stopped.

Figure 7:
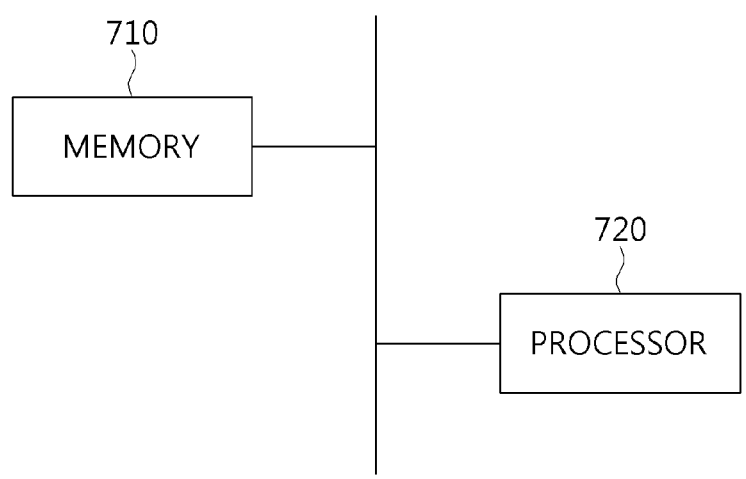
FIG. 7 is a block diagram illustrating an example of the reception apparatus illustrated in FIG. 1.

FIG. 7 is a block diagram illustrating an example of the reception apparatus illustrated in FIG. 1.

Referring to FIG. 7, the reception apparatus 120, illustrated in FIG. 1, includes memory 710 and a processor 720.

The memory 710 stores an authentication key that is shared with the transmission apparatus for quantum direct communication.

The processor 720 may perform the verification of security of a B-to-A quantum channel directed to the transmission apparatus using both a preset channel verification probability and a quantum state source generated for quantum direct communication.

The procedure for verifying the security of the B-to-A quantum channel is described below.

First, the reception apparatus may transmit the quantum state source to the transmission apparatus.

The transmission apparatus may select some of a plurality of quantum states included in the quantum state source based on the preset channel verification probability, as a verification quantum state for the verification of security of the B-to-A quantum channel. That is, each quantum state may be selected as the verification quantum state at the preset channel verification probability.

Thereafter, the transmission apparatus may randomly select any one of a z-basis and an x-basis, and may use the selected basis as a measurement basis for measuring the verification quantum state.

Next, the transmission apparatus may notify the reception apparatus that the verification of security of the B-to-A quantum channel is currently being performed, and may request a basis and a quantum state at the location selected as the verification quantum state from the reception apparatus. Here, in response to the request of the transmission apparatus, the reception apparatus may open the basis and the quantum state at the selected location in the quantum state source to the transmission apparatus.

Thereafter, the transmission apparatus may determine whether a measurement basis, randomly selected thereby, is identical to the basis opened by the reception apparatus. If the randomly selected measurement basis is identical to the opened basis, the transmission apparatus may determine whether a result, obtained by measuring the verification quantum state based on the randomly selected measurement basis, is identical to the quantum state opened by the reception apparatus, and may then verify the security of the B-to-A quantum channel.

Further, the processor 720 performs user authentication for the transmission apparatus using the authentication key and at least one verification quantum state, which is received from the transmission apparatus when verifying the security of the A-to-B quantum channel.

Here, user authentication for the transmission apparatus may be performed simultaneously with the verification of security of the A-to-B quantum channel.

For example, when the security of the A-to-B quantum channel is verified, the transmission apparatus selects a verification quantum state for security verification from the result $Ak_i|ini\rangle_i$, obtained by applying authentication operators $\{I, H\}$ based on an authentication key $Ak_i$ to a quantum state source $|ini\rangle_i$ received from the reception apparatus. That is, since the authentication key $Ak_i$ is already applied to the verification quantum state, selected for the security verification of the A-to-B quantum channel, the reception apparatus must also recover the verification quantum state $|ini\rangle_i$ using the authentication key $Ak_i$. By means of this procedure, it may be determined that user authentication for the transmission apparatus has been performed.

That is, the reception apparatus may reconstruct the verification quantum state (for security verification of the A-to-B quantum channel) received from the transmission apparatus using the authentication key, and may perform user authentication for the transmission apparatus in such a way as to compare the verification quantum state reconstructed by the reception apparatus with the initial quantum state source.

Therefore, location information provided to the reception apparatus so as to perform user authentication for the transmission apparatus may be identical to location information provided to the reception apparatus to verify the security of the A-to-B quantum channel.

Also, upon performing user authentication for the transmission apparatus, a message may not be encrypted depending on the stage for verifying the security of the A-to-B quantum channel.

Further, when the verification of security of the quantum channels fails, the processor 720 may stop quantum direct communication, and may reset quantum channels.

For example, when the verification of security of the A-to-B quantum channel fails, the A-to-B quantum channel may be reset with the quantum direct communication stopped, and thereafter quantum direct communication may resume.

Further, when the verification of security of the B-to-A quantum channel fails, the B-to-A quantum channel may be reset with the quantum direct communication stopped, and thereafter quantum direct communication may resume.

Meanwhile, when user authentication fails, the processor 720 stops quantum direct communication.

That is, if at least one of the transmission apparatus and the reception apparatus, which perform quantum direct communication, fails in user authentication, the security of communication cannot be guaranteed, and thus quantum direct communication may be stopped.

Figure 8:
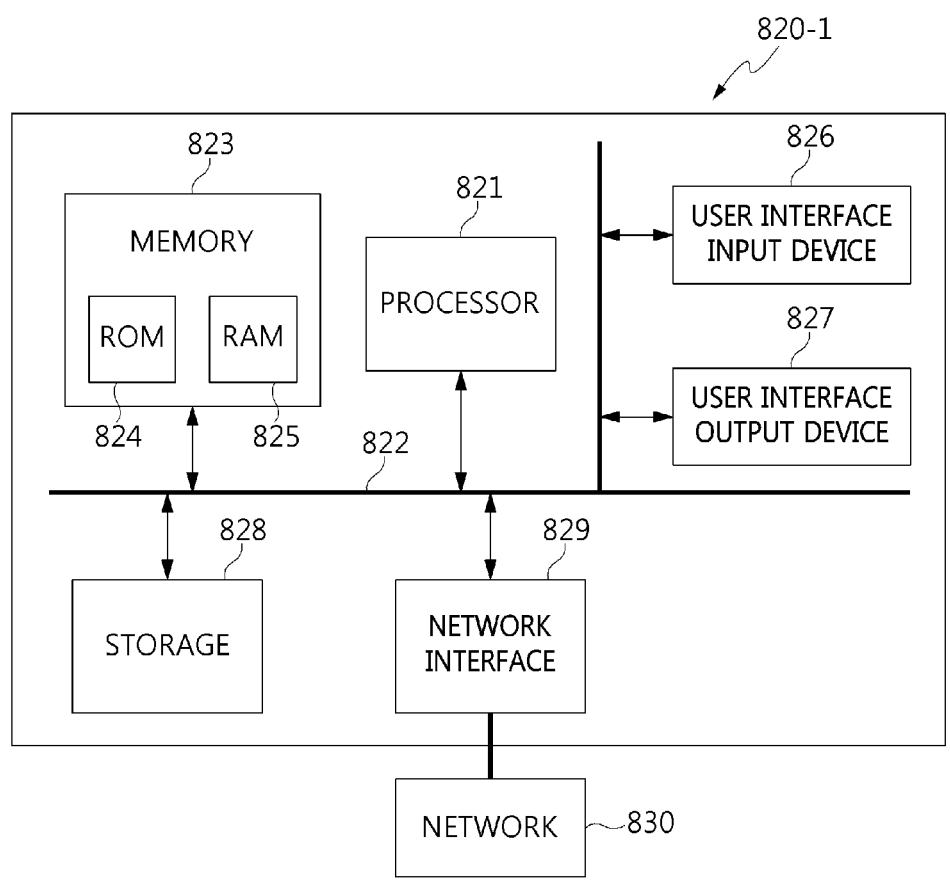
FIG. 8 is an embodiments of the present invention implemented in a computer system.

An embodiment of the present invention may be implemented in a computer system, e.g., as a computer readable medium. As shown in in FIG. 8, a computer system 820-1 may include one or more of a processor 821, a memory 823, a user interface input device 826, a user interface output device 827, and a storage 828, each of which communicates through a bus 822. The computer system 820-1 may also include a network interface 829 that is coupled to a network 830. The processor 821 may be a central processing unit (CPU) or a semiconductor device that executes processing instructions stored in the memory 823 and/or the storage 828. The memory 823 and the storage 828 may include various forms of volatile or non-volatile storage media. For example, the memory may include a read-only memory (ROM) 824 and a random access memory (RAM) 825.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

In accordance with the present invention, there may be provided quantum direct communication technology, which can be easily implemented compared to quantum direct communication using quantum entangled states.

Further, the present invention may provide a quantum direct communication technique, which can perform user authentication in a quantum communication frame.

Furthermore, the present invention may provide communication technology, which enables secure communication without requiring information that is pre-shared between users.

Furthermore, the present invention may realize secure communication between legitimate users by providing a user authentication procedure and a quantum direct communication technique in an integrated manner.

As described above, in the quantum direct communication method with user authentication and the apparatus using the method according to the present invention, the configurations and schemes in the above-described embodiments are not limitedly applied, and some or all of the above embodiments can be selectively combined and configured so that various modifications are possible.

What is claimed is:

1. A quantum direct communication method with user authentication, comprising:
    performing verification of security of a quantum channel using a preset channel verification probability and a quantum state source generated by a receiver of quantum direct communication;
    performing user authentication using one or more of a preset user authentication probability, the quantum state source, and an authentication key shared between the receiver and a sender;
    stopping the quantum direct communication and resetting the quantum channel when the verification of security of the quantum channel fails; and
    stopping the quantum direct communication when the user authentication fails.

2. The quantum direct communication method of claim 1, wherein the performing the user authentication comprises:
    performing user authentication for the receiver using an authentication encryption key that is configured based on authentication information corresponding to a message randomly generated by the sender; and
    performing user authentication for the sender simultaneously with the verification of security of an A-to-B quantum channel directed from the sender to the receiver.

3. The quantum direct communication method of claim 2, wherein the performing the user authentication for the receiver comprises:
    applying, by the sender, the authentication key to at least one quantum state selected from the quantum state source according to the preset user authentication probability;

encrypting, by the sender, at least one quantum state, to which the authentication key is applied, using the authentication encryption key, and then transmitting the encrypted quantum state to the receiver; and detecting, by the receiver, the authentication encryption key based on the authentication key and the quantum state source, and providing authentication information, decrypted using the authentication encryption key, to the sender.

4. The quantum direct communication method of claim 2, wherein the performing the user authentication is configured such that a verifier that is any one of the receiver and the sender notifies a verification target that is a remaining one, other than the verifier, that a current mode is a user authentication mode, and provides location information corresponding to the at least one quantum state to a prover.

5. The quantum direct communication method of claim 4, wherein, when the user authentication is user authentication for the sender, the receiver is the verifier, and when the user authentication is user authentication for the receiver, the sender is the verifier.

6. The quantum direct communication method of claim 4, wherein location information that is provided to the receiver to perform user authentication for the sender is identical to location information that is provided to the receiver to perform verification of security of the A-to-B quantum channel.

7. The quantum direct communication method of claim 2, wherein the performing the user authentication for the sender comprises:

applying the authentication key to at least one quantum state, selected by the sender from the quantum state source according to the preset channel verification probability, upon performing the verification of security of the A-to-B quantum channel; and applying a preset encryption operator to the at least one quantum state, to which the authentication key is applied, and transmitting a resulting quantum state to the receiver such that the receiver is capable of performing user authentication in consideration of identicalness of the at least one quantum state.

8. The quantum direct communication method of claim 7, wherein the verification of security of the quantum channel is performed on the A-to-B quantum channel and on a B-to-A quantum channel directed from the receiver to the sender.

9. The quantum direct communication method of claim 1, further comprising:

generating, by the sender, a message encryption operator corresponding to a message to be delivered to the receiver based on a preset encryption operator;

transmitting, by the sender, an encrypted result, obtained by applying the authentication key and the message encryption operator to the quantum state source, to the receiver; and decrypting, by the receiver, the message by comparing a result, obtained by applying the authentication key to the quantum state source, with the encrypted result.

10. The quantum direct communication method of claim 1, wherein the quantum state source is generated in accordance with a single quantum state other than quantum entangled states.

11. A transmission apparatus comprising:
a memory configured to store an authentication key that is shared with a reception apparatus of quantum direct communication; and a processor configured to:
perform verification of security of an A-to-B quantum channel directed to the reception apparatus using a preset channel verification probability and a quantum state source generated by the reception apparatus, perform user authentication for the reception apparatus using one or more of a preset user authentication probability, the quantum state source, and the authentication key, when the verification of security of the quantum channel fails, stop quantum direct communication, and reset the quantum channel, and when the user authentication fails, stop the quantum direct communication.

12. The transmission apparatus of claim 11, wherein the processor is configured to apply the authentication key to at least one quantum state selected from the quantum state source according to the preset user authentication probability, to encrypt the at least one quantum state, to which the authentication key is applied, using an authentication encryption key that is configured based on authentication information corresponding to a randomly generated message, and to transmit the encrypted quantum state to the reception apparatus.

13. The transmission apparatus of claim 12, wherein the processor is configured to receive authentication information, decrypted by the reception apparatus based on the authentication encryption key, and to perform user authentication for reception apparatus by comparing the received authentication information with the authentication information corresponding to the randomly generated message.

14. The transmission apparatus of claim 13, wherein the authentication encryption key is detected based on the authentication key and the quantum state source.

15. The transmission apparatus of claim 12, wherein the processor notifies the reception apparatus that a current mode is a user authentication mode and provides location information corresponding to the at least one quantum state to the reception apparatus.

16. The transmission apparatus of claim 11, wherein the processor generates a message encryption operator corresponding to a message to be delivered to the reception apparatus based on a preset encryption operator, and transmits an encrypted result, obtained by applying the authentication key and the message encryption operator to the quantum state source, thus enabling quantum direct communication to be performed.

17. A reception apparatus comprising:
a memory configured to store an authentication key that is shared with a transmission apparatus of quantum direct communication; and a processor configured to:
perform verification of security of a B-to-A quantum channel directed from the transmission apparatus using a preset channel verification probability and a quantum state source generated for quantum direct communication, perform user authentication for the transmission apparatus using the authentication key and at least one verification quantum state which is received from the transmission apparatus upon performing verification of security of an A-to-B quantum channel, when the verification of security of the quantum channel fails, stop quantum direct communication and reset the quantum channel, and when the user authentication fails, stop quantum direct communication.

18. The reception apparatus of claim 17, wherein the user authentication for the transmission apparatus is performed simultaneously with the verification of security of the A-to-B quantum channel.

19. The reception apparatus of claim 17, wherein the processor is configured to receive location information for the verification of security of the A-to-B quantum channel from the transmission apparatus, and to compare a result, obtained by decrypting the at least one verification quantum state using the authentication key, with at least one quantum state corresponding to the location information in the quantum state source, thus performing user authentication for the transmission apparatus.

* * * * *